US008750092B2

(12) United States Patent
Hachiya et al.

(10) Patent No.: US 8,750,092 B2
(45) Date of Patent: Jun. 10, 2014

(54) PACKET TRANSMISSION DEVICE

(75) Inventors: Koji Hachiya, Fukuoka (JP); Tetsuo Ehara, Fukuoka (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 12/049,496

(22) Filed: Mar. 17, 2008

(65) Prior Publication Data
US 2008/0232375 A1 Sep. 25, 2008

(30) Foreign Application Priority Data

Mar. 20, 2007 (JP) ................................. 2007-072200

(51) Int. Cl.
*H04L 12/26* (2006.01)
(52) U.S. Cl.
USPC ............................ 370/218; 370/244; 370/392
(58) Field of Classification Search
USPC ......................................... 370/244, 389, 392
See application file for complete search history.

(56) References Cited

U.S. PATENT DOCUMENTS

| | | | |
|---|---|---|---|
| 6,501,754 B1* | 12/2002 | Ohba et al. ..................... | 370/389 |
| 7,248,568 B1* | 7/2007 | Loc et al. ........................ | 370/312 |
| 7,283,484 B1* | 10/2007 | Choudhury et al. .......... | 370/252 |
| 2003/0084367 A1* | 5/2003 | Suemura ........................... | 714/4 |
| 2003/0137932 A1 | 7/2003 | Nishioka et al. | |
| 2003/0147352 A1 | 8/2003 | Ishibashi et al. | |
| 2004/0019676 A1* | 1/2004 | Iwatsuki et al. ............... | 709/224 |
| 2005/0185954 A1 | 8/2005 | Sadananda et al. | |

FOREIGN PATENT DOCUMENTS

| | | |
|---|---|---|
| JP | 10-117175 | 5/1998 |
| JP | 2006-233076 | 9/2006 |

OTHER PUBLICATIONS

European Search Report dated Jul. 3, 2008, from the corresponding European Application.

* cited by examiner

*Primary Examiner* — Chirag Shah
*Assistant Examiner* — Jenkey Van
(74) *Attorney, Agent, or Firm* — Katten Muchin Rosenman LLP

(57) ABSTRACT

There is provided a packet transmission device which comprises a packet transfer processing part and a control part. The packet transfer processing part includes a table memory comprising a path selection table, a link status table, and a node status table. In these tables, information of each of paths, links, and nodes are stored and linked each other. A link/node status monitoring part in the control part monitors a packet outputted from the packet transfer processing part transmission and detects a fault occurred in a transmission of the packet. The fault is reflected on the information of paths in the tables only by updating the information of links and nodes and the path for packets outputted from the device is assigned in a short time.

9 Claims, 16 Drawing Sheets

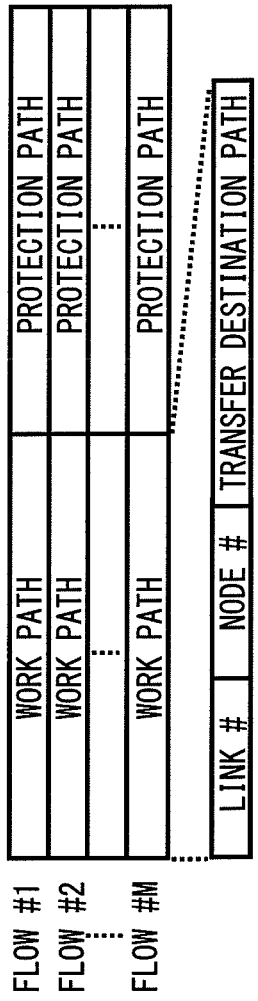
Fig. 2A
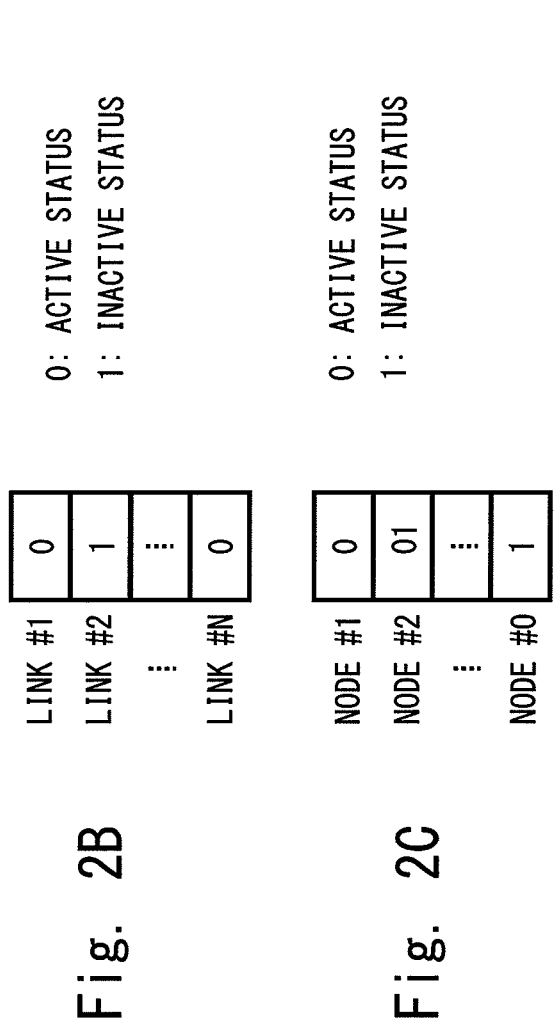
Fig. 2B
Fig. 2C

| | WORK PATH | PROTECTION PATH |
|---|---|---|
| Flow #1 | WORK PATH | PROTECTION PATH |
| Flow #2 | WORK PATH | PROTECTION PATH |
| ... | .... | .... |
| Flow #M | WORK PATH | PROTECTION PATH |

| V | LINK # | NODE # |
|---|---|---|

V= Valid bit  0: VALID  1: INVALID
LINK #: ADDRESS #1-#N IN THE LINK STATUS TABLE
NODE #: ADDRESS #1-#0 IN THE NODE STATUS TABLE

Fig. 7A

| LINK #1 | 0 |
|---|---|
| LINK #2 | 1 |
| ... | ... |
| LINK #N | 0 |

0: VALID
1: INVALID

Fig. 7B

| NODE #1 | 0 |
|---|---|
| NODE #2 | 0 |
| ... | ... |
| NODE #0 | 1 |

0: VALID
1: INVALID

Fig. 7C

```
>Display table
>>
>>Path selection table
>>
>Flow# :  Link#    Node#    Transmit#
>>0x0000:  0x0000   0x0000   0x0000
>>0x0001:  0x0100   0x0200   0x0400
>>                   .....
>>
>Link Status Table
>>
>Link# : Status
>>0x0000: 000010000  01000000  00000000  00000000
>>0x0020: 00000000   00001010  00000000  00000000
>>                   .....
>>
```

Fig. 10

PACKET TRANSMISSION DEVICE

BACKGROUND OF THE INVENTION

1. Field of the Invention

The present invention relates to a packet transmission device, and more particularly, relates to a packet transmission device that enables to switch Pseudo Wires (PW) in a Multiprotocol Label Switching (MPLS) network at a high speed.

2. Description of the Related Art

In recent years, service such as Pseudo Wire Emulation Edge to Edge (PWE3) that virtually provides a point-to-point Ethernet® line on a MPLS line has been provided. Moreover, as high-speed and reliable MPLS networks are required, techniques that enable quick fault recovery less than or equal to 50 msec on the MPLS line such as Fast ReRoute (FRR) that reroutes a traffic at a high speed (less than or equal to 50 msec) when a fault occurred on a physical link of a network have been applied. A technique that enables quick fault recovery on a network is described in Japanese Laid-open Patent Publication No. 10-117175. Hereinafter, in order to facilitate understanding of the technique, a fault recovery method by FRR used in known MPLS networks will be described with reference to FIG. 11. Further, a known packet transmission device will be described with reference to FIGS. 12 to 15.

FIG. 11 is a system chart illustrating an example of a known MPLS network configuration and fault recovery method. In FIG. 11, in a PWE3 in the known MPLS network, links established between packet transmission devices (Provider Edges; hereinafter, referred to as PE) have several Label Switch Paths (LSPs) respectively. In a fault recovery by FRR, protection paths are provided to avoid points (link, node) where faults can occur on protection target work paths.

In the example shown in FIG. 11, paths established from a PE 50 through a PE 51 to a PE 52 are the protection target work paths. In preparation for an occurrence of a fault between the PE 50 and the PE 51, protection paths from the PE 50 through a PE 53 to the PE 52 are provided. The number of the links and paths (LSPs) on the protection paths are the same as those on the work paths.

If a fault occurs between the PE 50 and the PE 51, the PE 50 that is disposed at a branch point performs a switching operation. The PE 52 that is disposed at a point where the paths merge again receives a label for a work path and a label for a protection path. Accordingly, the fault recovery is achieved when the PE 50 simply switches the label for the work path to that for the protection path.

In such a case, conventionally, the PE disposed at the branch point switches all of the LSPs that constitute the link when a fault occurs by the configurations and operation shown in FIGS. 12 to 15.

FIG. 12 is a block diagram illustrating an example of a configuration of the known packet transmission device (PE) shown in FIG. 11. As shown in FIG. 12, the known PE includes a packet transfer processing part 60 and control part 70 as a basic configuration.

The packet transfer processing part 60 includes an input packet interface (input packet IF) 61, a flow identification part 62, a transfer destination control part 63, an output packet interface (output packet IF) 64, and a table memory 65 that stores a transfer destination information table 65a.

In the packet transfer processing part 60, a flow number of a packet that is taken by the input packet IF 61 from an input path is identified in the flow identification part 62. According to the flow number, the transfer destination control part 63 acquires transfer destination information from the transfer destination information table 65a, and determines an output path of the output packet IF 64.

A link/node status monitoring part 71 provided in the control part 70 constantly monitors status of link/node shown by the output packet IF 64 of the packet transfer processing part 60, and reflects the acquired link/node status on the transfer destination information table 65a provided in the packet transfer processing part 60.

Hereinafter, detailed description will be made. FIG. 13 illustrates an example of a configuration of the transfer destination information table shown in FIG. 12. As shown in FIG. 13, the transfer destination information table 65a stores flow number #1 to flow number #M as addresses, and also stores transfer destination paths respectively. The number #1 to the flow number #M are flow numbers of the packet identified by the flow identification part 62.

The link/node status monitoring part 71 provided in the control part 70, by following a procedure shown in FIG. 14, updates the transfer destination information table 65a provided in the packet transfer processing part 60. FIG. 14 is a flowchart illustrating an operation of the link/node status monitoring part provided in the control part shown in FIG. 12. In FIG. 14, a monitoring method of link status is described. It is noted that monitoring of node status is also performed in a similar procedure and a similar processing. In FIG. 14, steps that show the processing procedure are simply abbreviated as "ST". This is applied in each flowchart shown below.

In FIG. 14, in ST 41, the link/node status monitoring part 71 stands by coming of timing for monitoring the output packet IF 64. At a timing for monitoring the output packet IF 64, (ST 41: Yes), the link/node status monitoring part 71 monitors status of the output packet IF 64 and acquires information whether the output packet IF 64 is in active status or in inactive status (ST 42). Then, the link/node status monitoring part 71 accesses to the transfer destination information table 65a, and according to the status of the link (active or inactive), updates all transfer destination paths associated with the link (ST 43). In ST 43, for example, in a case where two paths (LSPs) are established in one link, two transfer destination paths of the paths are overwritten. Then, the process returns to ST 41, and the link/node status monitoring part 71 stands by coming of a next monitoring timing.

FIG. 15 is a view illustrating an operation of the packet transfer processing part shown in FIG. 12. In FIG. 15, for example, the input packet IF 61 takes in a packet of a flow #10 from an input path. Then, the flow identification part 62 identifies a flow of the packet received from the input packet IF 61 and determines a number "10", and outputs the determined flow number "10" to the transfer control part 63 together with the received packet.

In the above-described transfer destination information table 65a that is overwritten by the link/node status monitoring part 71 provided in the control part 70, a transfer destination path "4000" is stored in the flow #10 (address). Then, the transfer destination control part 63 acquires the transfer destination information #4000 from the transfer destination information table 65a based on the flow number #10 received from the flow identification part 62. Then the transfer destination control part 63 determines an output path of the output packet IF 64 based on the acquired transfer destination information #4000, and instructs the output packet IF 64 to output the packet.

As described above, in the known fault recover method, if a fault occurred in a link or node, the PE performs the switching processing on the all paths (LSPs) in the link or node. In the known MPLS network, only several paths (LSPs) are established in one link. Accordingly, even if a fault occurs in one link or node, it is enough to change transfer destination information of the several paths. Therefore, it is possible to strictly keep the restriction that the fault recover time is to be less than or equal to 50 msec.

However, in a MPLS network (FIG. 16) to be established, if the above-mentioned known fault recover method is applied, it is not possible to strictly keep the restriction that the fault recover time is to be less than or equal to 50 msec.

FIG. 16 is a system chart illustrating a configuration of the MPLS network and an operation in a case where the known fault recover method is applied. As shown in FIG. 16, in the configuration of the MPLS network to be established according to the present invention, similarly to the case in FIG. 11, protection paths of a PE 80 through a PE 83 to a PE 82 are provided with respect to work paths of the PE 80 through a PE 81 to the PE 82. However, the number of the paths (LSPs) constituting links established between a PE and a PE is largely different from that of the known configuration. In a PWE3 in the MPLS network of the present invention, each link includes several thousands of paths (LSPs).

In such a case, in the PE 80 to PE 83 formed in a similar configuration to that of the known PE 50 to PE 53, if a fault recovery is performed, when a fault occurs in a link, transfer destination information of the several thousands of paths has to be changed. Accordingly, it is difficult to strictly keep the restriction that the fault recover time is to be less than or equal to 50 msec.

FIG. 17 is a view illustrating local repair required in the MPLS network. FIG. 18 is a view illustrating global repair required in the MPLS network. In the MPLS network to be established, a PE that is disposed at a branch point between a work path and a protection path is expected, as shown in FIG. 17, to correspond to not only local repair in which only a path status between neighbor PEs is checked and paths are switched, as shown in FIG. 18, but also expected to correspond to global repair in which a path status of foregoing PEs is checked and paths are switched.

SUMMARY

The present invention has been made in view of the above, and an object of the present invention is to provide a packet transmission device capable of performing high-speed fault recovery even in a network in which a huge number of paths are set.

Another object of the present invention, in the above-described invention, is to provide a packet transmission device capable of performing path switching corresponding to not only local repair but also global repair.

In order to achieve the above-described objects, a packet transmission device according to one of the embodiments of the present invention is provided. The packet transmission device performs switching between a work path and a protection path of pseudo wire in a MPLS network. The packet transmission device includes a path selection table in which link numbers and transfer destination information in the work path and the protection path are associated and set with each other for each flow number included in a packet to be transferred, a table memory for storing a link status table in which the link numbers and status of the link are associated and set with each other, path selection processing means for acquiring link numbers of the work path and the protection path from the path selection table based on a flow number of a packet taken from an input path, referring to the link status table, selecting the work path or the protection path whose link status is active, and acquiring transfer destination information of the selected path from the path selection table, transfer control means for transmitting the received packet to an output path determined based on the transfer destination information acquired by the path selection processing means, and monitoring means for monitoring link status of each output path and updating the link status table based on whether the link is active or inactive.

The monitoring means updates only the link status stored in the link numbers in the link status table. The path selection processing means performs path selection using the link status table updated by the monitoring means. Accordingly, when a link fault occurs, all paths in the fault link can be switched at a time.

Further more in the packet transmission device described above, in the path selection table, a valid bit indicating whether the path is valid or invalid in the work path and the protection path is added for each of the flow numbers, the path selection processing means acquires the valid bits of the work path and the protection path from the path selection table based on the flow number of the packet taken from the input path, if both of the valid bits of the work path and the protection path are valid, acquires link numbers of the work path ant the protection path from the path selection table based on the flow number of the packet taken from the input path and refers to the link status table, selects the work path or the protection path whose link status is active, acquires transfer destination information of the selected path from the path selection table, if one of the valid bit of the work path and the protection path indicates valid, selects the valid path, and acquires transfer destination information of the selected path from the path selection table.

According to the embodiment described above, in addition to the path selection corresponding to local repair, path selection corresponding to global repair can also be performed.

According to another aspect of the present invention, a packet transmission device performs switching between a work path and a protection path of pseudo wire in a MPLS network. The packet transmission device includes a path selection table in which node numbers and transfer destination information in the work path and protection path are associated and set with each other for each flow number included in a packet to be transferred, a table memory for storing a node status table in which the node numbers and status indicating whether the nodes are active or inactive are associated and set with each other, path selection processing means for acquiring node numbers of the work path and protection path from the path selection table based on a flow number of a packet taken from an input path, referring to the node status table, selecting the work path or the protection path whose node status is active, and acquiring transfer destination information of the selected path from the path selection table, transfer control means for transmitting the received packet to an output path determined based on the transfer destination information acquired by the path selection processing means, and monitoring means for monitoring node status of each output path and updating the node status table based on whether the node is active or inactive.

According to the another aspect, the monitoring means updates only the node status stored in the node numbers in the node status table. The path selection processing means performs path selection using the node status table updated by the monitoring means. Accordingly, when a node fault occurs, all paths in the fault node can be switched at a time.

According to still another aspect of the present invention, in the packet transmission device above described, in the path selection table, a valid bit indicating whether the path is valid or invalid in the work path and the protection path is added for each of the flow numbers, the path selection processing means acquires the valid bits of the work path and the protection path from the path selection table based on the flow number of the packet taken from the input path, if both of the valid bits of the work path and the protection path are valid, acquires node numbers of the work path ant the protection path from the path selection table based on the flow number of the packet taken from the input path and refers to the node status table, selects the work path or the protection path whose node status is active, acquires transfer destination information of the selected path from the path selection table, if one of the valid bit of the work path and the protection path indicates valid, selects the valid path, and acquires transfer destination information of the selected path from the path selection table.

According to the still another aspect of the present invention, in addition to the path selection corresponding to local repair described above, path selection corresponding to global repair can also be performed.

According to yet another aspect of the present invention, the packet transmission device further includes table display means for outputting contents of the various tables stored in the table memory on a display screen.

According to the aspect described above, it is possible to provide the contents of the various tables to operators or system administrators at a time of operation. Accordingly, maintainability can be ensured.

BRIEF DESCRIPTION OF THE DRAWINGS

FIG. 2A illustrates an example of a configuration of a path selection table shown in FIG. 1, FIG. 2B illustrates an example of a configuration of a link status table shown in FIG. 1, and FIG. 2C illustrates an example of a configuration of a node status table shown in FIG. 1;

FIG. 7A illustrates an example configuration of a path selection table shown in FIG. 6;

FIG. 7B illustrates an example configuration of the link status table shown in FIG. 6;

FIG. 7C illustrates an example configuration of the node status table shown in FIG. 6;

FIG. 10 illustrates a display example of table contents that is displayed by a table display part shown in FIG. 9 on a screen of a personal computer;

DESCRIPTION OF THE PREFERRED EMBODIMENTS

Preferred embodiments of the packet transmission device according to the present invention will be described in detail with reference to drawings below.

First Embodiment

Figure 1:
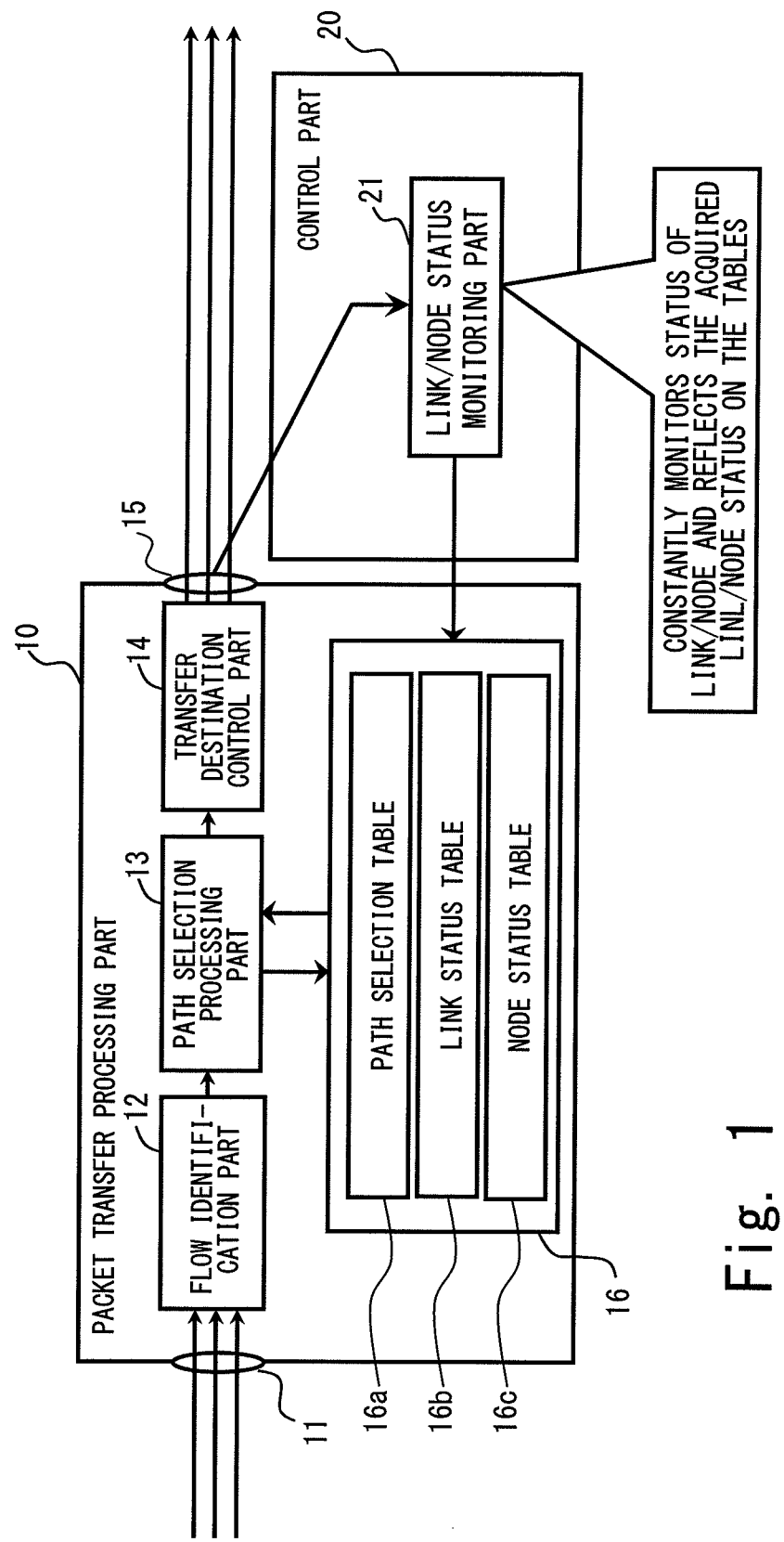
FIG. 1 is a block diagram illustrating a configuration of a packet transmission device (PE) according to a first embodiment of a packet transmission device according to the present invention.
Figure 16:
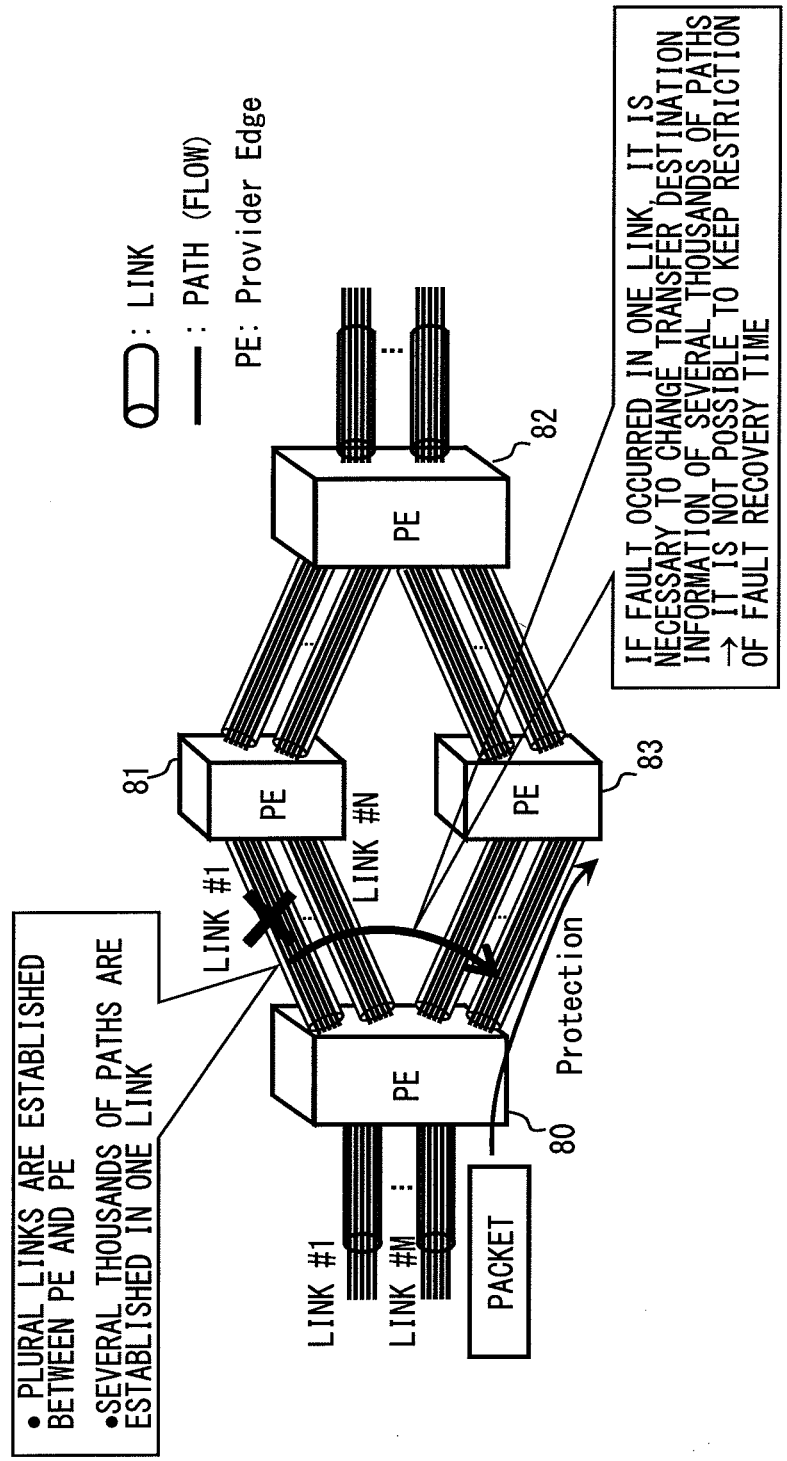
FIG. 16 is a system chart illustrating a configuration of a MPLS network established according to the present invention and an operation in a case where a known fault recover method is applied.

FIG. 1 is a block diagram illustrating a configuration of a packet transmission device (PE) according to a first embodiment of a packet transmission device according to the present invention. The packet transmission device according to the present invention is used as a router or a switch in a MPLS network, for example, shown in FIG. 16, the network in which several thousands of paths are established in one link.

As shown in FIG. 1, the PE according to the first embodiment includes a packet transfer processing part 10 and a control part 20 as a basic configuration.

The packet transfer processing part 10 includes an input packet interface (input packet IF) 11, a flow identification part 12, a path selection processing part 13, a transfer destination control part 14, an output packet interface (output packet IF) 15, and a table memory 16. The table memory 16 stores a path selection table 16a, a link status table 16b, and a node status table 16c.

In the packet transfer processing part 10, a flow number of a packet that is taken by the input packet IF 11 from an input path is identified in the flow identification part 12. According to the flow number, the path selection processing part 13 acquires corresponding information (transfer destination information, link status, and node status) from various tables (16a, 16b, 16c) in the table memory 16. Then, the transfer destination control part 63 determines an output path of the output packet IF 15 based on the information (transfer destination information, link status, and node status) received from the path selection processing part 13.

A link/node status monitoring part 21 provided in the control part 20 constantly monitors status of link/node shown by the output packet IF 15 of the packet transfer processing part 10, and reflects the acquired link/node status on the status table (16b, 16c) provided in the packet transfer processing part 10.

Hereinafter, detailed description will be made. First, the example of the configuration of various tables shown in FIG. 1 will be described. FIG. 2A is an example of a configuration of the path selection table 16a, and FIG. 2B is an example of a configuration of the link status table 16b. FIG. 2C is an example of a configuration of the node status table 16c.

As shown in FIG. 2A, the path selection table 16a stores flow number #1 to flow number #M as addresses, and also stores pairs of a work path and a protection path respectively. Both of the work paths and the protection paths store "link numbers #", "node numbers #", and "transfers destination information (paths)". The "link numbers #" show addresses (#1 to #N) of the link status table 16b in the configuration shown in FIG. 2B. The "node numbers #" show addresses (#1 to #O) of the link status table 16c in the configuration shown in FIG. 2C.

As shown in FIG. 2B, the link status table 16b stores link number #1 to link number #N as addresses, and also stores, for example, one of logical values 0 that show active status and logical values 1 that show inactive status respectively. Further, as shown in FIG. 2C, the link status table 16c stores node number #1 to node number #0 as addresses, and also stores, for example, one of logical values 0 that show active status and logical values 1 that show inactive status respectively.

Figure 3:
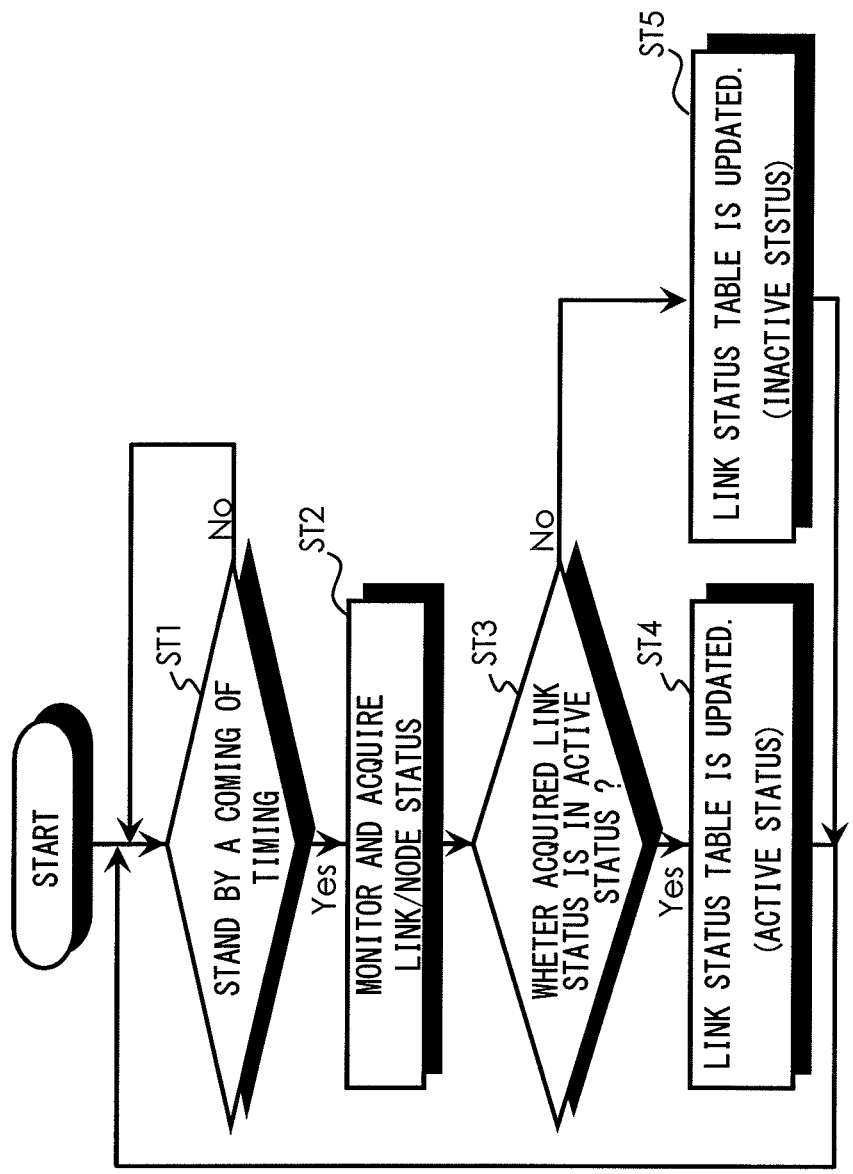
FIG. 3 is a flowchart illustrating an operation of a link/node status monitoring part provided in a control part shown in FIG. 1.

The link/node status monitoring part 21 provided in the control part 20, by following a procedure shown in FIG. 3, updates the link status table 16b and the link status table 16c provided in the packet transfer processing part 10. FIG. 3 is a flowchart illustrating an operation of the link/node status monitoring part shown in FIG. 1. In FIG. 3, a monitoring method of link status is described. It is noted that monitoring of node status is performed in a similar procedure and a similar processing.

In FIG. 3, in ST 1, the link/node status monitoring part 21 stands by a coming of timing for monitoring a link/node status shown by the output packet IF 15. At a timing for monitoring the link/node status shown by the output packet IF 15, (ST 1: Yes), the link/node status monitoring part 21 monitors and acquires the link/node status shown by the output packet IF 14 (ST 2). Then, the link/node status monitoring part 21 determines whether the acquired link status is in active status or inactive status (ST 3). If it is determined that the acquired link status is active (ST 3: Yes), the link status table 16b is updated using the acquired link number as an address, and the link status (active=0) as data (ST 4). Then, the process returns to ST 1, and the link/node status monitoring part 21 stands by a coming of next monitoring timing.

If it is determined that the acquired link status is inactive (ST 3: No), the link status table 16b is updated using the acquired link number as an address, and the link status (inactive=1) as data (ST 5). Then, the process returns to ST 1, and the link/node status monitoring part 21 stands by a coming of next monitoring timing.

It is to be noted that in the MPLS network according to the present invention, several thousands of paths are established in one link, and as mentioned in the description of the known MPLS network, generally, a plurality of paths (LPSs) are established in one link. Then, in a plurality of flow numbers, even if "transfer destination information (paths)" differ one another, "link numbers #" may be the same one another. Accordingly, if the link/node status monitoring part 21, for example, in the above example, updates the link status of a link number # in the link status table only once, all paths in the link are updated.

Figure 4:
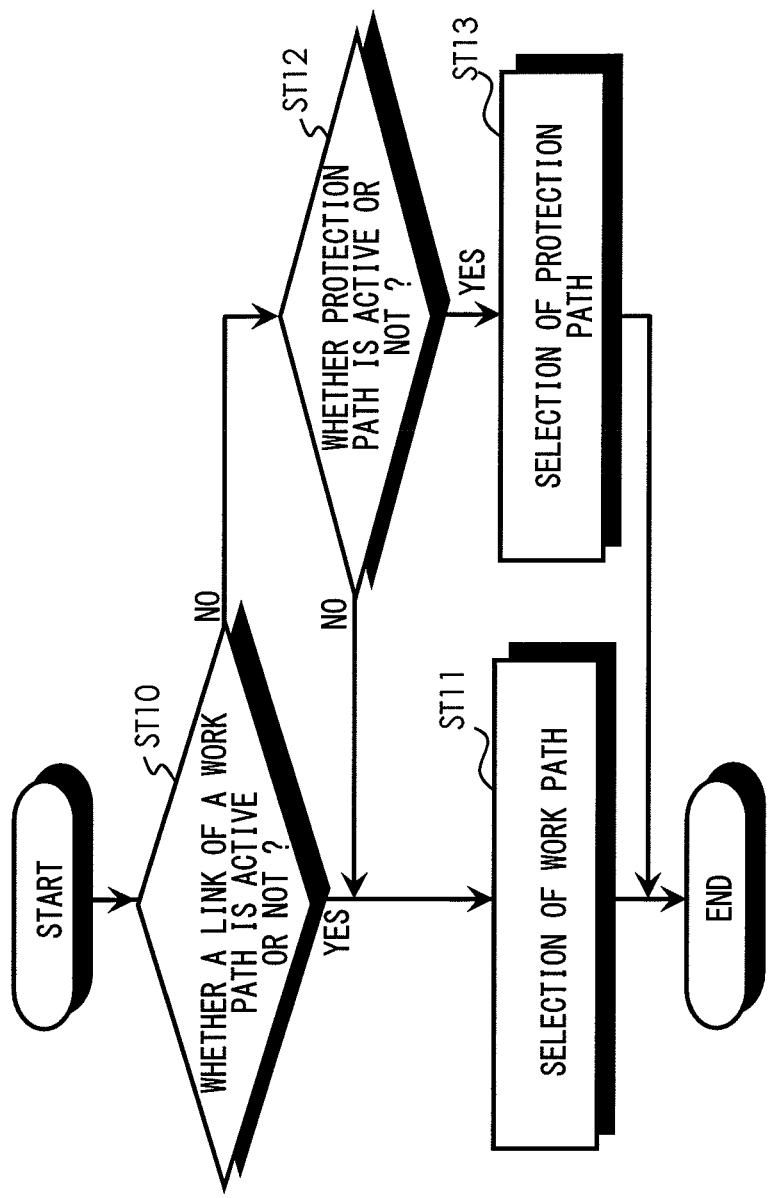
FIG. 4 is a flowchart illustrating an operation of a path selection processing part shown in FIG. 1.

The path selection processing part 13, by the procedure shown in FIG. 4, performs a path selection using the link status table 16b and the node status table 16c that are updated by the link/node status monitoring part 21 provided in the control part 20 as described above. FIG. 4 is a flowchart illustrating operation of the path selection processing part shown in FIG. 1. In FIG. 4, in order to facilitate understanding, the description has been made by focusing the link stats between the link status and the node status.

In FIG. 4, in ST 10, it is determined whether a link of a work path is active or not based on the link status table 16b that is referred to in the "link number #" in the work path read out from the path selection table 16a using the flow number received from the flow identification part 12.

As a determination result in ST 10, if it is determined that the link of the work path is active (ST 10: Yes), the work path is selected (ST 11), and the path selection processing is ended. That is, the "link number" and the "transfer destination information (path)" at the flow number in the work path is read out from the selection table 16a, and the information is given to the transfer control part 14.

As a determination result in ST 10, on the other hand, if it is determined that the link of the work path is inactive (ST 10: No), according to the procedure similar to that in ST 10, whether a link of a protection path is active or not is determined based on the link status table 16b that is referred to in the "link number #" in the protection path read out from the path selection table 16a using the flow number received from the flow identification part 12 (ST 12).

Then, as a result in ST 12, if it is determined that the link of the protection path is active (ST 12: Yes) the protection path is selected (ST 13), and the path selection processing is ended. That is, the "link number" and the "transfer destination information (path)" at the flow number in the protection path are read out from the selection table 16a, and the information is given to the transfer control part 14. On the other hand, if it is determined that the protection path is inactive (ST 12: No), the work path is forcibly selected (ST 11), and the path selection processing is ended.

Figure 5:
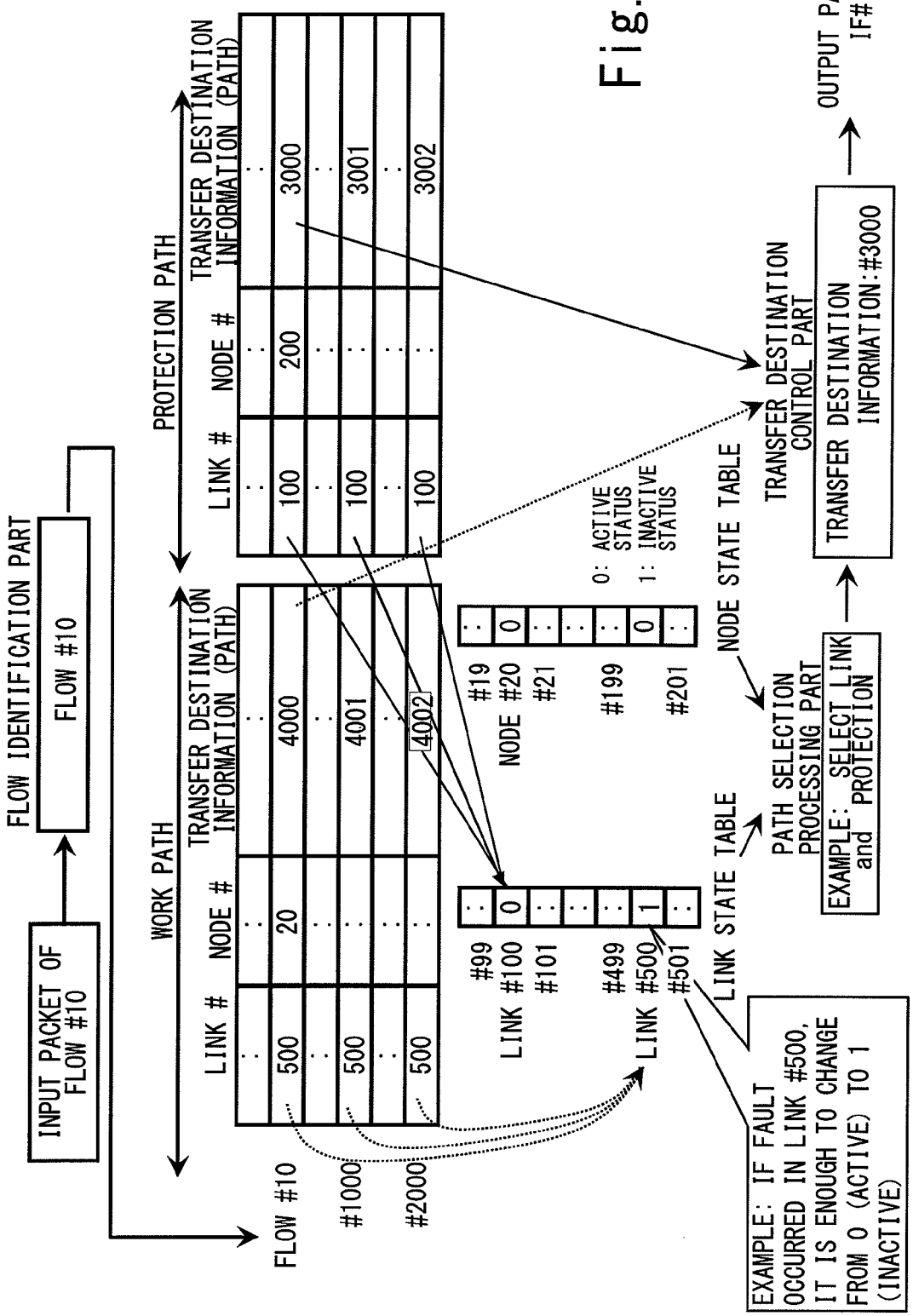
FIG. 5 is a view illustrating an operation of a packet transfer processing part shown in FIG. 1.

FIG. 5 is a view illustrating an operation of the packet transfer processing part shown in FIG. 1. In FIG. 5, in order to facilitate understanding, between the two status tables (16b, 16c), only the link status table 16b is focused and described.

In FIG. 5, for example, the input packet IF 11 takes a packet of a flow #10 from an input path, the flow identification part 12 identifies the flow of the packet received form the input packet IF 11 and determines a number "10", and outputs the determined flow number "10" to the path selection processing part 13 together with the received packet.

On the path selection table 16a, although transfer destination information (paths) of 4000, 4001, and 4002 corresponding to work paths of #10, #1000, and #2000 differ with each other, they have a same corresponding link number #500. Similarly, transfer destination information (paths) of 3000, 3001, and 3002 corresponding to protection paths of #10, #1000, and #2000 differ with each other, however, they have a same corresponding link number #100.

The path selection processing part 13 acquires the link number 500 of the work path and the link number 100 of the protection path from the path selection table 16a based on the flow number "10". Then, the path selection processing part 13 acquires a link status from the link status table 16b using the acquired link number 500 and the link number 100 as addresses. The link status at the link number 500 is 1 (inactive), and the link status at the link number 100 is 0 (active). Accordingly, the path selection processing part 13 selects the protection path, and notifies information (link number #100, transfer destination information #3000) at the protection path to the transfer destination control part 14.

The transfer destination control part 14 determines an output path of the output packet IF 15 based on the transfer destination information #3000 of the protection path, the information is received from the path selection processing part 13, and outputs the packet.

In the example shown in FIG. 5, originally, since the link status at the address (#500) on the link status table 16b was 0 (active), the path selection processing part 13 selected the link number #500 (transfer destination information #4000) and the transfer destination control part 14 determined the output path based on the transfer destination information #4000. In this state, a path selection to be performed when a fault occurs at the link number #500 (transfer destination information #4000), and the link/node status monitoring part 21 changes only the link status at the address (#500) on the link status table 16b from 0 (active) to 1 (inactive) is shown.

As described above, according to the first embodiment, the link status and the node status are respectively stored on the tables, the link status and the node status are constantly monitored, and respective status tables are updated. Accordingly, if a fault occurs, without considering the number of the paths in each link or each node, it is enough to perform only a switching processing of the link status or the node status of the link where the fault occurred. Therefore, the packet transmission device (PE) according to the first embodiment, the device is disposed at the branch point of the work path and the protection path refers to the status tables updated in such way, and can switch the all paths in the fault link or the fault node at a time from the work path to the protection path. The time necessary for the switching is very short.

Accordingly, in the MPLS network according to the present invention, the network in which a huge number of paths of thousands of paths are established in each link, it is possible to largely reduce the path switching time as compared with that of the known path switching method, and keep the restriction that the path switching time is less than or equal to 50 msec.

Figure 17:
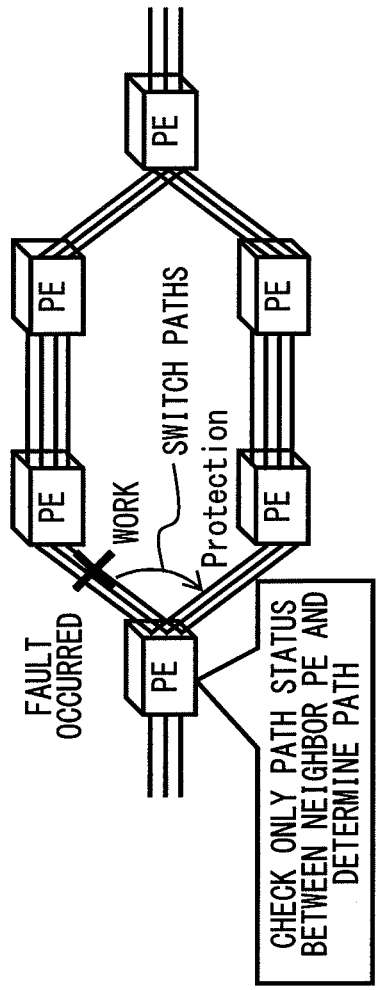
FIG. 17 is a view illustrating local repair required in a MPLS network.
Figure 18:
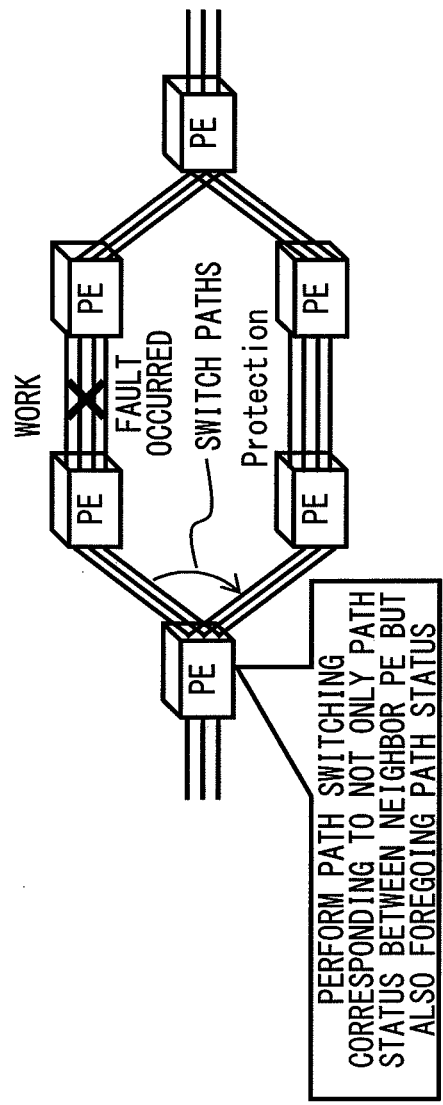
FIG. 18 is a view illustrating global repair required in a MPLS network.

It is noted that the fault recovery described in the first embodiment corresponds to the local repair shown in FIG. 17. With respect to the global repair shown in FIG. 18, a configuration described in a second embodiment can be applied.

Second Embodiment

Figure 6:
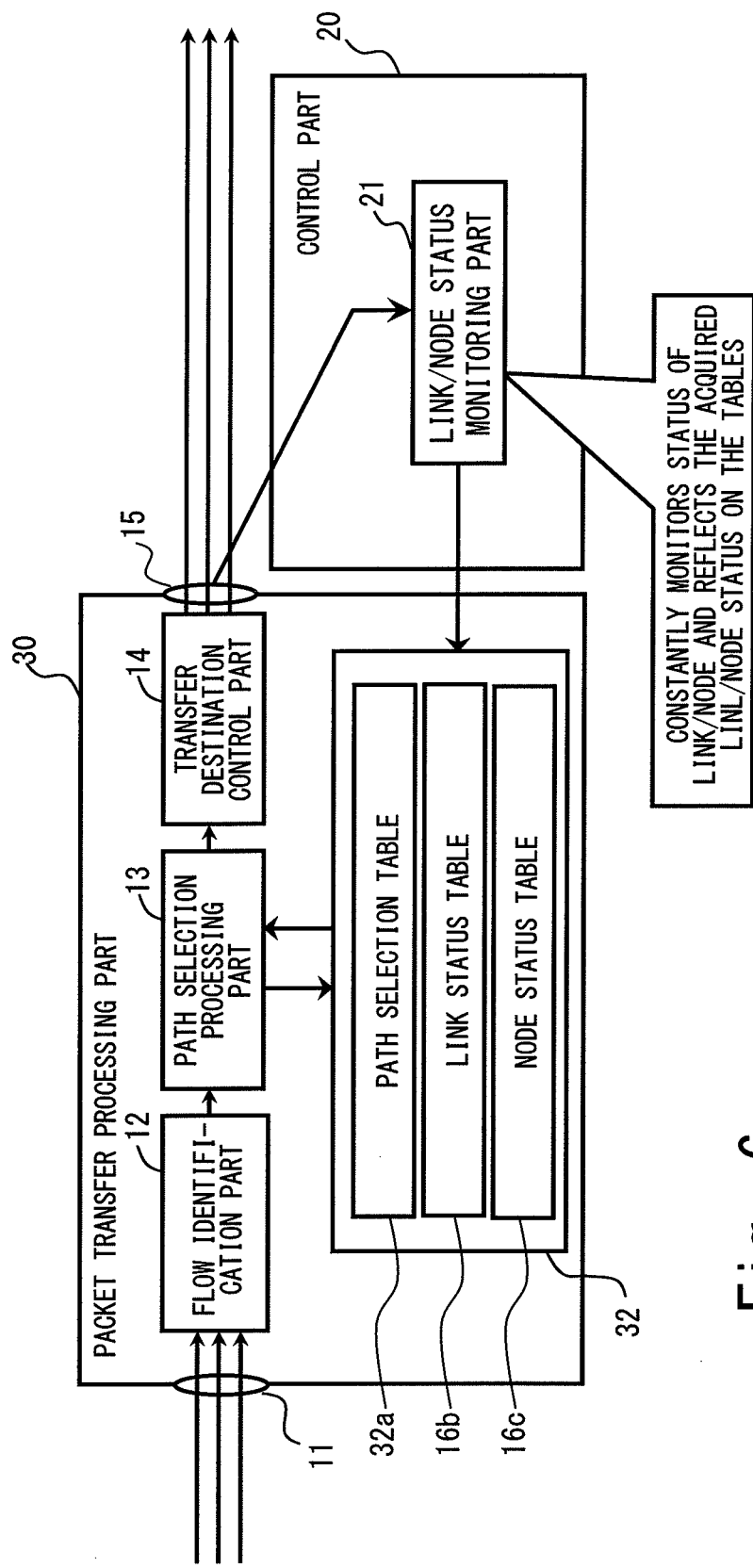
FIG. 6 is a block diagram illustrating a configuration of a packet transmission device (PE) according to a second embodiment of a packet transmission device according to the present invention.

FIG. 6 is a block diagram illustrating a configuration of a packet transmission device (PE) according to the second embodiment of a packet transmission device according to the present invention. In the second embodiment, in addition to the local repair described in the first embodiment, an example of a configuration that can correspond to the global repair is shown. In FIG. 6, the same reference numbers are applied to structural elements the same or similar to those shown in FIG. 1 (first embodiment). In this description, parts concerning to the second embodiment will be mainly described.

As shown in FIG. 6, the packet transmission device (PE) according to the second embodiment has a packet transfer processing part 30 in place of the packet transfer processing part 10 of the configuration shown in FIG. 1 (first embodiment). In the packet transfer processing part 30, the path selection processing part 13 shown in FIG. 1 (first embodiment) is changed to a path selection processing part 31, and the table memory 16 is changed to a table memory 32. In the table memory 32, the path selection table 16a is changed to a path selection table 32a.

Now, examples of configurations of various tables shown in FIG. 6 will be described. FIG. 7B is an example of a configuration of the link status table 16b, and FIG. 7C is an example of a configuration of the node status table 16c. The configurations are similar to those in the first embodiment, and accordingly, their descriptions will be omitted.

In the path selection table 32a according to the second embodiment, as shown in FIG. 7A, in the work path and the protection path, in addition to the "link number #", "node number #", and "transfer destination path information", valid bits V that show "valid" or "invalid" of the paths are added. The valid bits V, for example, show "valid" if a logical value is 0, and show "invalid" if the logical value is 1. The valid bits V are transmitted from a management center, or the like, and written by the control part 20.

Figure 8:
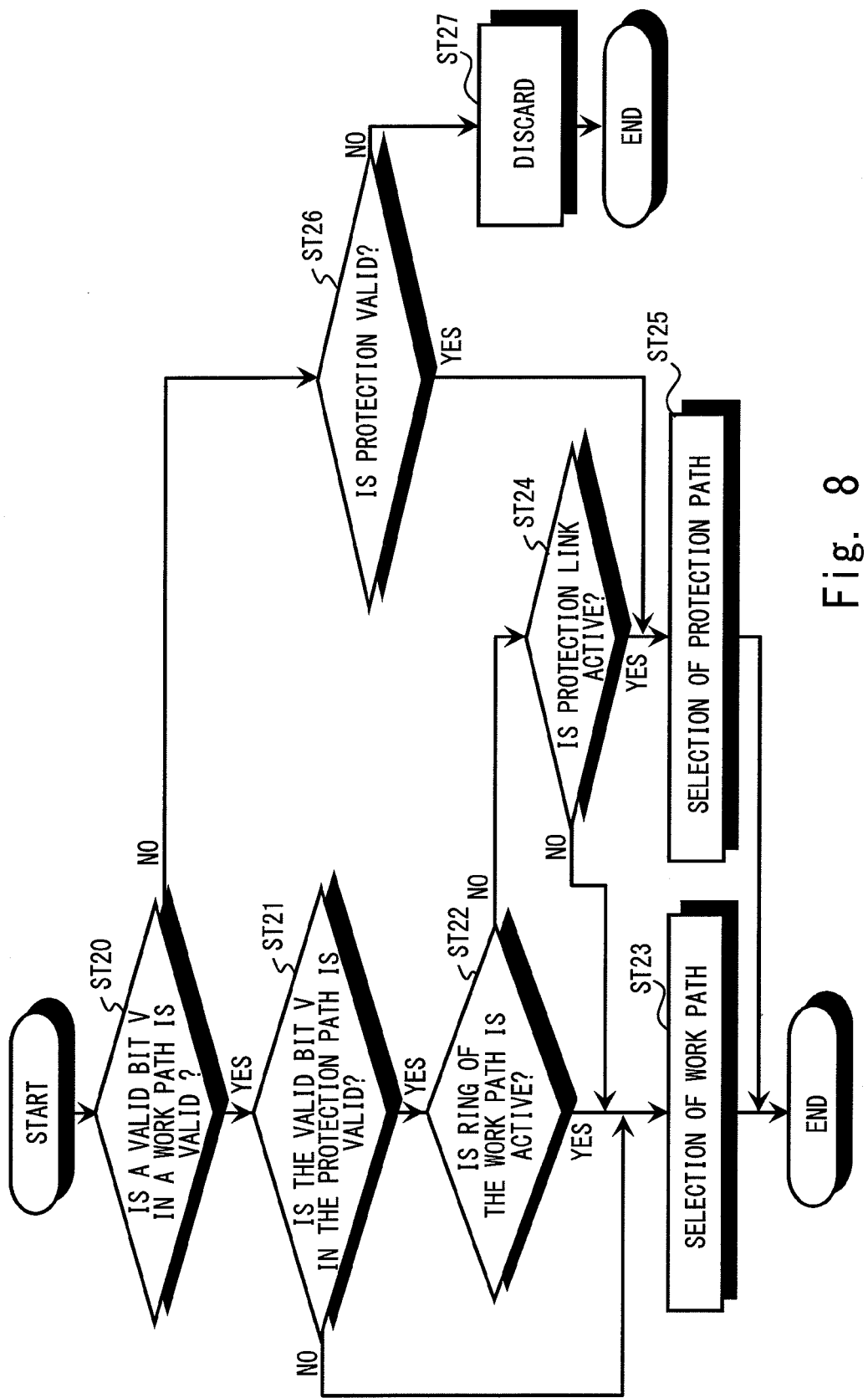
FIG. 8 is a flowchart illustrating an operation of a path selection processing part shown in FIG. 6.

The path selection processing part 31 can perform a path selection at the global repair using the valid bit V in addition to the path selection at the local repair described in the first embodiment. Hereinafter, a description will be made with reference to FIG. 8. In FIG. 8, similarly to FIG. 4, between the link status and the node status, the link status is focused and described.

FIG. 8 is a flowchart illustrating an operation of the path selection processing part shown in FIG. 6. In FIG. 8, in ST 20, it is determined whether a valid bit V in a work path read out from the path selection table 32a is valid or invalid based on a flow number received from the flow identification part 12.

As a result of the determination in ST 20, in both cases that it is determined that the valid bit V is valid (ST 20: Yes) and the valid bit V is invalid (ST 20: No), based on the flow number received from the flow identification part 12, it is determined whether the valid bit V in the protection path read out from the path selection table 32a is valid or invalid (ST 21, ST 26).

If it is determined that the valid bit V in the work path is valid (ST 20: Yes), and the valid bit V in the protection path is valid (ST 21: Yes), a processing similar to the processing (local repair) in FIG. 4 is performed.

That is, if the valid bit V in the protection path is valid (ST 21: Yes), whether the ring of the work path is active or inactive is determined (ST 22) based on the link status table 16b that is referred to using the "link number #" and "node number #" in the work path read out from the path selection table 32a based on the flow number received from the flow identification part 12.

As a result of determination in ST 22, if it is determined that the link of the work path is active (ST 22: Yes), the work path is selected (ST 23), and the path selection processing is ended. On the other hand, if it is determined that the link of the work path is inactive (ST 22: No), using a similar procedure to that in ST 22, whether the link of the protection path is active or inactive is determined (ST 24) based on the link status table 16b that is referred to using the "link number #" in the protection path read out from the path selection table 16a based on the flow number received from the flow identification part 12.

As a result of the determination in ST 24, if it is determined that the link of the protection path is active (ST 24: Yes), the protection path is selected (ST 25), and the path selection processing is ended. On the other hand, if it is determined that the link of the protection path is inactive (ST 24: No), the work path is forcibly selected (ST 23), and the path selection processing is ended.

On the other hand, if it is determined that the valid bit V in the work path is valid (ST 20: Yes), and the valid bit V in the protection path is invalid (ST 21: No), the work path is forcibly selected (ST 23), and the path selection processing is ended. If it is determined that the valid bit V in the work path is invalid (ST 20: No), and the valid bit V in the protection path is valid (ST 26: Yes), the protection path is forcibly selected (ST 25), and the path selection processing is ended.

Accordingly, if the valid bit V is valid in one of the work path and protection path, the valid path is forcibly selected, and the global repair is performed. If it is determined that the valid bit V in the work path is invalid (ST 20: No), and the valid bit V in the protection path is also invalid (ST 26: No), the packet is discarded (ST 27), and the path selection processing is ended.

As described above, the valid bit is added on each flow number, and the path selection method is switched depending on whether the valid bit V is valid in both of the work path and the protection path or the valid bit is valid in one of the paths. Accordingly, the device can correspond to not only the local repair in which fault recovery between neighbor PEs is possible, but also the global repair in which network fault recovery other than neighbor PEs is possible.

Third Embodiment

Figure 9:
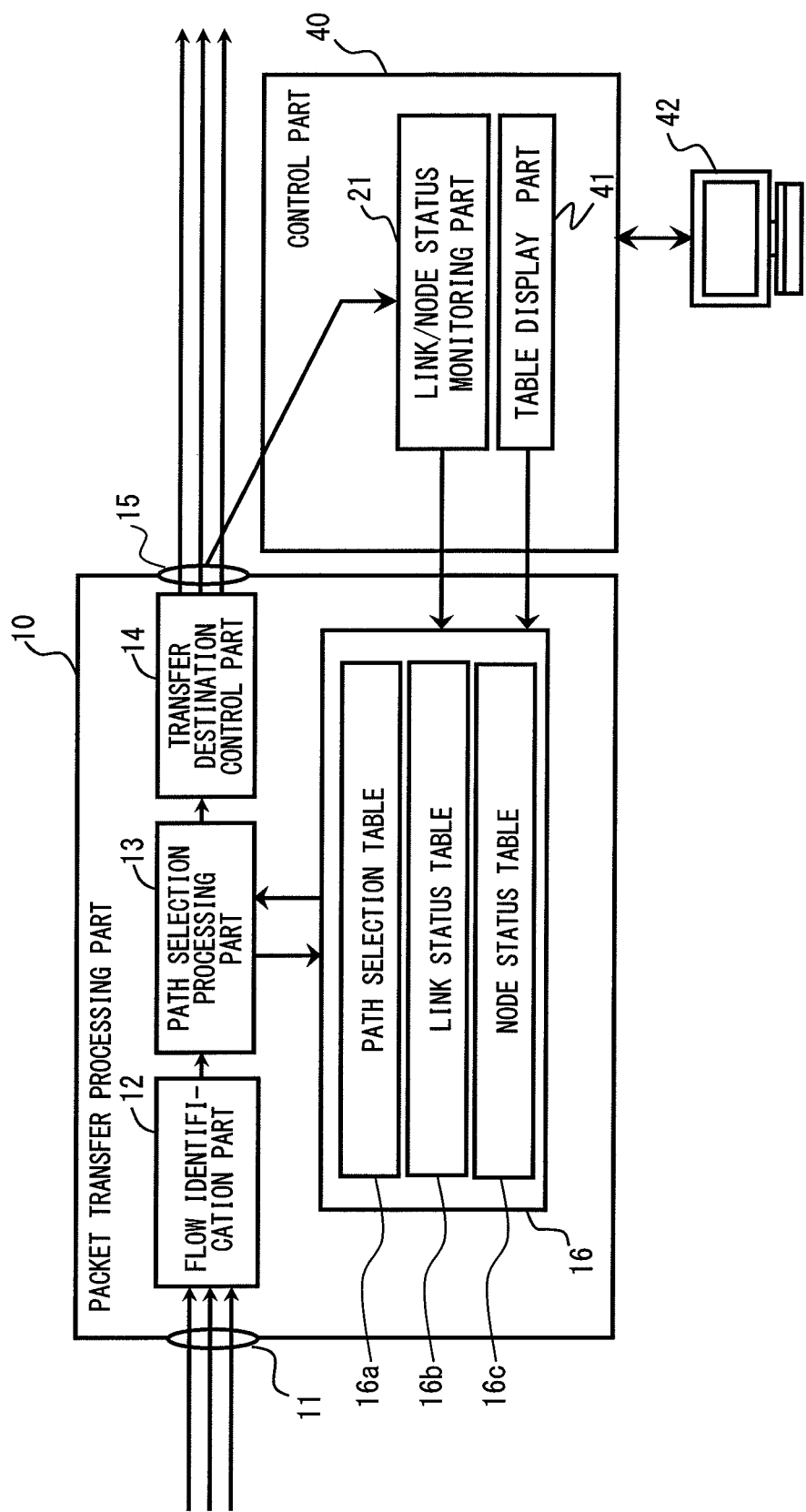
FIG. 9 is a block diagram illustrating a configuration of a packet transmission device (PE) according to a third embodiment of a packet transmission device according to the present invention.
Figure 11:
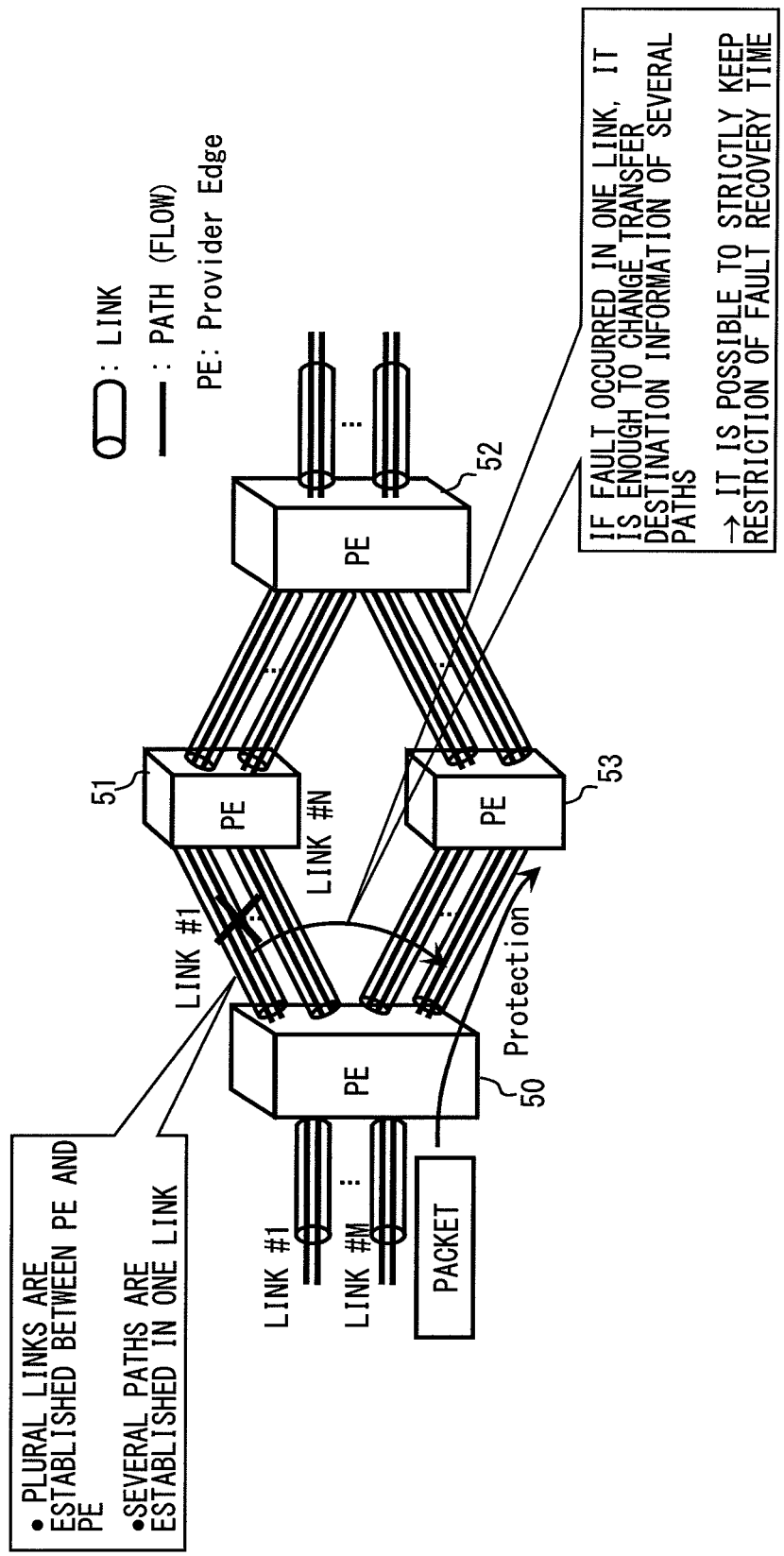
FIG. 11 is a system chart illustrating an example of a known MPLS network configuration and fault recovery method.
Figure 12:
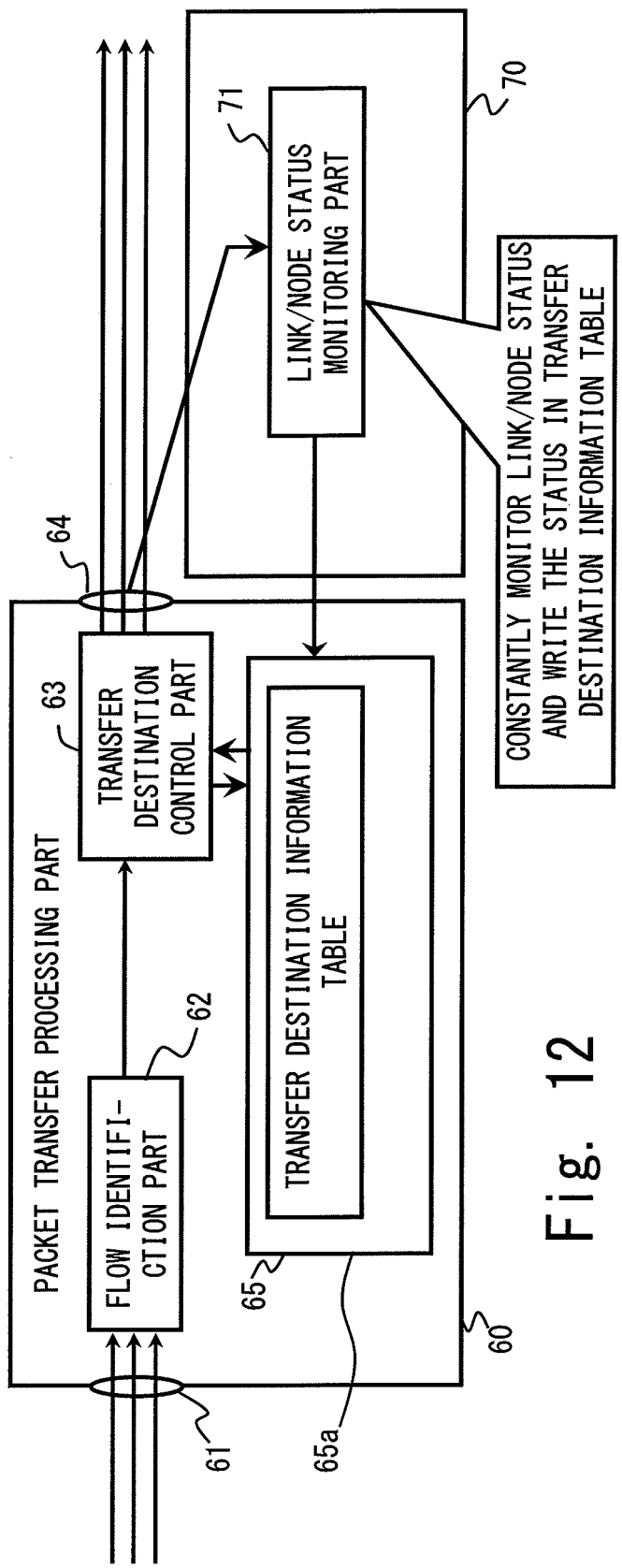
FIG. 12 is a block diagram illustrating an example of a configuration of a known packet transmission device (PE) shown in FIG. 11.
Figure 13:
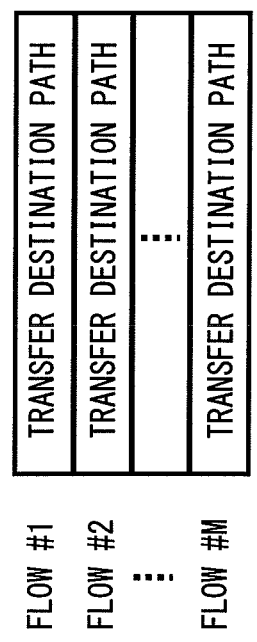
FIG. 13 illustrates an example of a configuration of a transfer destination information table shown in FIG. 12.
Figure 14:
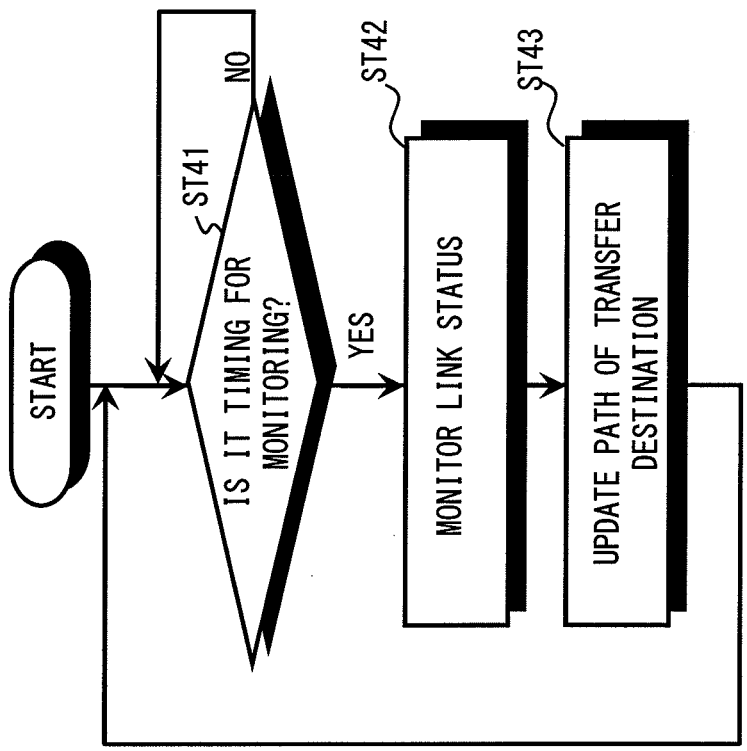
FIG. 14 is a flowchart illustrating an operation of a link/node status monitoring part shown in FIG. 12.
Figure 15:
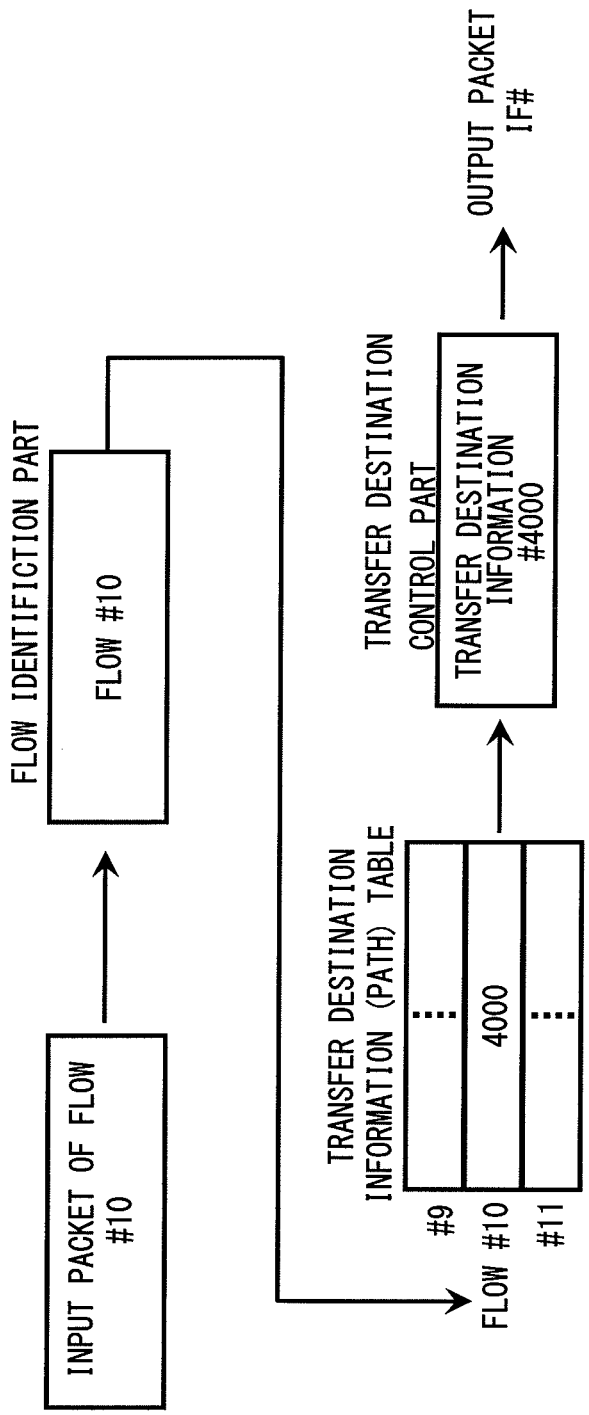
FIG. 15 is a view illustrating an operation of a packet transfer processing part shown in FIG. 12.

FIG. 9 is a block diagram illustrating a configuration of a packet transmission device (PE) according to a third embodiment of a packet transmission device according to the present invention. In FIG. 9, the same reference numbers are applied to structural elements the same or similar to those shown in FIG. 1 (first embodiment). In this description, parts concerning to the third embodiment will be mainly described.

As shown in FIG. 9, the packet transmission device (PE) according to the third embodiment has a control part 40 in place of the control part 20 of the configuration shown in FIG. 1 (first embodiment). In the control part 40, a table display part 41 is added, and to the table display part 41, a personal computer 42 is connected.

FIG. 10 illustrates a display example of table contents that is displayed on a screen of the personal computer by the table display part shown in FIG. 9. The table display part 41 receives a command from the personal computer 42, reads contents in the table memory 16, for example, contents of the path selection table 16*a*, and displays the contents on the display screen of the personal computer 42, for example, in a style shown in FIG. 10.

As described above according to the third embodiment, it is possible to provide the contents of the work path and the protection path to operators or system administrators at the time of operation. Accordingly, even in the MPLS network in which several thousands of paths (LSPs) are established in one link, maintainability can be ensured and improved. It is noted that in the third embodiment, the example is applied to the first embodiment, however, the example can be similarly applied to the second embodiment.

As described above, the packet transmission device according to the present invention is effective in switching a line from a work path to a protection path at a high speed when a fault occurred in a MPLS network. Especially, the packet transmission device is suitable for a MPLS network in which a huge number of paths, several thousands of paths, are set in one link to keep a restriction of fault recovery time.

Further, the packet transmission device according to the present invention is effective in switching paths in a MPLS network that corresponds to not only local repair but also global repair.

What is claimed is:

1. A packet transmission device for transferring a packet, the packet transmission device to be connected with input and output paths comprising:
    a table memory configured to store individually a path selection table and a link status table, the path selection table including a plurality of entries, each of the plurality of entries being associated with a flow number, which is included in the packet and is available to indicate the packet, and including a set of information, the set of information including link number information and transfer destination information that are associated with each of a first path and a second path, the first path being associated with a first link number and the second path being associated with a second link number, the link status table including a plurality of entries, each of the plurality of entries being associated with the link number information of a link and information of a status of the link, the information of the status indicating that the link indicated by the link number information is usable or not for transmission of the packet, the second link number being changed when the link number information is changed;
    a path selection processor configured to acquire the link number information of the first path and the second path from the path selection table on the basis of the information of the flow number of the packet taken from the input path, to select a path from the first and second paths, the information of status associated with the selected path being usable from the link status table, and to acquire the transfer destination information associated with the acquired link number information of the selected path from the path selection table;
    a transfer controller to transmit the packet to the output path on the basis of transfer destination information acquired by the path selection processor; and
    a monitor to repeatedly monitor the status of the link of a side of the output path for relaying the packet and to update the link status table based on whether the link is usable or not, wherein
    a valid bit is added for information of each flow number in the path selection table, the valid bit indicating whether the selected path is usable or not in the first and the second paths,
    the path selection processor acquires information of the valid bits of the first path and the second path from the path selection table on the basis of the flow number of the packet taken from the input path, acquires the information of the link numbers of the first and the second paths from the path selection table on the basis of the information of the flow number of the packet taken from the input path, in the case of the valid bits of the first and second paths being valid, selects information of a path of the first or second path from the link status table, the path being usable, and acquires the transfer destination information of a selected path from the path selection table, the selected path being included in one of the first and second paths, the valid bit of the one of the first and second paths being indicating usable, and
    the packet is discarded in case of the valid bits of the first and the second paths being invalid.

2. The packet transmission device according to claim 1, the packet transmission device further comprises a table display to output contents of various tables stored in the table memory on a display screen.

3. The packet transmission device according to claim 1, wherein a plurality of links corresponding to the first path with same link number information are changed to the second path when the information of status indicates that the link is not usable for transmission of the packet.

4. The packet transmission device according to claim 1, wherein each of pieces of the link number information stored in the path selection table is changed to the corresponding second paths when the information of status stored in the link status table indicates that the link associated with the link number information is not usable for transmission of the packet.

5. A packet transmission device transferring a packet, the packet transmission device to be connected with input and output paths comprising:
- a table memory configured to store individually a path selection table and a node status table, the path selection table including a plurality of entries, each of the plurality of entries being associated with a flow number, which is included in the packet and is available to indicate the packet, and including node number and transfer destination information in a first path and a second path for each flow number included in a packet to be transferred, the node number and the transfer destination information being associated with each other, the node status table including a plurality of entries, each of the plurality of entries being associated with information of the node number and information of node status, the information of the node status indicating whether a node associated with the node number is usable or not, the node number and the node status being associated with each other;
- a path selection processor configured to acquire the information of the node number of the first and second paths from the path selection table and the node status table on the basis of the flow number of the packet taken from the input path, to select the first path or the second path, the node associated with the selected path being usable based on the information of the node status in the node status table, and to acquire the transfer destination information of the selected path from the path selection table;
- a transfer controller to transmit the packet to the output path determined on the basis of the transfer destination information acquired by the path selection processor; and
- a monitor to repeatedly monitor the node status of each output path for relaying the packet and updating the information of the node status in the node status table to change the respective information of node status of each of the first path and the second path based on whether the node is usable or not, wherein
- a valid bit is added for the information of each flow number in the path selection table, the valid bit indicating whether the path is usable or not in the first and the second paths,
- the path selection processor configured to acquire information of the valid bits of the first path and the second path from the path selection table on the basis of the flow number of the packet taken from the input path, to acquire the information of the node number of each of the first and the second paths from the path selection table on the basis of the information of the flow number of the packet taken from the input path, when the valid bits of the first and second paths are valid, to select information of a path of the first or second path from the node status table, the node status according to the selected path being usable, and to acquire the transfer destination information of the selected path from the path selection table, and to acquire either the first or second path, the acquired path including the valid bit indicating that the acquired path is usable when the valid bit of one of the first and second paths is usable and to acquire the transfer destination information of the acquired path from the path selection table, and
- when the valid bits of the first and the second paths are invalid, the packet is discarded.

6. The packet transmission device according to claim 5, the packet transmission device further comprises a table display to output contents of various tables stored in the table memory on a display screen.

7. The packet transmission device according to claim 5, wherein a plurality of links corresponding to the first path with same link number information are changed to the second path when the information of status indicates that the node is not usable for transmission of the packet.

8. A method for a packet transmission device transferring a packet, the packet transmission device to be connected with input and output paths comprising:
- storing information of a path selection table and a link status table, the path selection table including a plurality of entries, each of the plurality of entries being associated with a flow number, which is included in the packet and is available to indicate the packet, and including a set of information, the set of information including link number information and transfer destination information that are associated with each of a first path and a second path, the first path being associated with a first link number and the second path being associated with a second link number, the link status table including a plurality of entries, each of the plurality of entries being associated with the link number information of a link and information of a status of the link, the information of the status indicating that the link indicated by the link number information is usable or not for transmission of the packet, the second link number being to be changed when the link number information is changed;
- acquiring, by a path selection processor, the link number information of the first path and the second path from the path selection table on the basis of the information of the flow number of the packet taken from the input path, to select a path from the first and second paths, the information of status associated with the selected path being usable from the link status table, and acquiring the transfer destination information associated with the acquired link number information of the selected path from the path selection table;
- controlling to transmit the packet to the output path on the basis of transfer destination information acquired by the path selection processor; and
- monitoring repeatedly the status of the link of a side of the output path for relaying the packet and updating the link status table based on whether the link is usable or not,
- adding valid bit information to the information of each flow number in the path selection table, the valid bit information indicating whether the path is usable or not in the first and the second paths,
- acquiring, by the path selection processor, the valid bit information of the first path and the second path from the path selection table on the basis of the flow number of the packet taken from the input path, and the information of the link numbers of the first and the second paths from the path selection table on the basis of the information of the flow number of the packet taken from the input path,
- selecting, by the path selection processor, in the case of the valid bit information of the first and second paths being valid, information of a path of the first or second path from the link status table, the path being usable, and acquiring the transfer destination information of a selected path from the path selection table, the selected path being included in one of the first and second paths, the valid bit information of the one of the first and second paths being indicating usable,
- discarding the packet in case of the valid bit information of the first and second paths being invalid.

9. The method for a packet transmission device according to claim 8, wherein a plurality of links corresponding to the first path with same link number information are changed to the second path when the information of status indicates that the link is not usable for transmission of the packet.

\* \* \* \* \*